United States Patent
Bond

(10) Patent No.: US 6,616,102 B1
(45) Date of Patent: Sep. 9, 2003

(54) APPARATUS FOR DEICING AIRCRAFT

(75) Inventor: Anthony E. Bond, Omaha, NE (US)

(73) Assignee: Glazer Enterprises, Inc., Omaha, NE (US)

( * ) Notice: Subject to any disclaimer, the term of this patent is extended or adjusted under 35 U.S.C. 154(b) by 0 days.

(21) Appl. No.: 10/090,352

(22) Filed: Mar. 4, 2002

(51) Int. Cl.[7] .............................................. B64D 15/00
(52) U.S. Cl. ............................... 244/134 R; 244/134 C
(58) Field of Search ......................... 244/134 R, 134 C; 15/3.12, 3.14; 134/45, 60, 61, 103.2, 103.1, 172, 173

(56) References Cited

U.S. PATENT DOCUMENTS

| | | | |
|---|---|---|---|
| D197,376 S | | 1/1964 | Przybylski |
| 3,169,581 A | * | 2/1965 | Cummins ..................... 169/24 |
| 3,533,395 A | | 10/1970 | Yaste |
| 4,634,084 A | | 1/1987 | Magnusson |
| 4,900,891 A | * | 2/1990 | Vega et al. ............... 219/121.6 |
| 5,104,068 A | | 4/1992 | Krilla et al. |
| 5,318,254 A | * | 6/1994 | Shaw et al. ............. 244/134 C |
| 5,354,014 A | * | 10/1994 | Anderson ............... 244/134 C |
| 5,454,533 A | | 10/1995 | Grant et al. |
| 5,458,299 A | | 10/1995 | Collins et al. |
| 5,490,646 A | * | 2/1996 | Shaw et al. ............. 244/134 C |
| 5,746,396 A | * | 5/1998 | Thorton-Trump ....... 244/134 R |
| 5,857,646 A | * | 1/1999 | Taricco ................... 244/134 R |
| 6,068,216 A | * | 5/2000 | Prins ....................... 244/134 R |
| 6,092,765 A | | 7/2000 | White |
| 6,477,730 B1 | * | 11/2002 | Marrero ....................... 15/53.1 |
| 2003/0042365 A1 | * | 3/2003 | Mittereder et al. ..... 244/134 R |

* cited by examiner

Primary Examiner—Charles T. Jordan
Assistant Examiner—Stephen Holzen
(74) Attorney, Agent, or Firm—Thomte, Mazour & Niebergall; Dennis L. Thomte

(57) ABSTRACT

An apparatus is described for deicing an aircraft in one pass of the aircraft through the apparatus with the apparatus including a pair of spaced-apart deicing devices. Each of the deicing devices comprises a vertically disposed support tower having an upstanding boom pedestal rotatably mounted on the upper end thereof. An elongated, telescopic boom assembly is pivotally mounted on the pedestal for selective extension and retraction with respect thereto. An elongated support is pivotally mounted on the outer end of the boom assembly and has an operator's cab selectively movably mounted thereon. Spray nozzles are mounted on the operator's cab to enable the operator to spray deicing fluid onto the aircraft.

20 Claims, 13 Drawing Sheets

APPARATUS FOR DEICING AIRCRAFT

BACKGROUND OF THE INVENTION

1. Field of the Invention

This invention relates to an apparatus for deicing aircraft and more particularly to an apparatus for deicing an aircraft in one pass of the aircraft through the apparatus which includes a pair of spaced-apart deicing devices.

2. Description of the Related Art

During winter months and periods of freezing conditions, it is necessary that ice and snow be removed from aircraft preparing to take off. Many different types of deicing devices have been previously provided. Many different types of truck-mounted deicing devices have been provided wherein a telescoping, rotatable pivotal boom extends from the truck with the outer end of the boom having a spray nozzle or the like thereon for directing deicing fluid onto the aircraft. Normally, the truck is maneuvered with respect to the aircraft and the same is time-consuming and labor intensive. Occasionally, the deicing trucks inadvertently come into contact with the aircraft and cause damage thereto.

It has been found that perhaps the best method of deicing aircraft is to position the aircraft between a pair of movable deicing devices with those devices being moved relative to the aircraft to spray deicing fluid thereon. However, it is believed that the prior art devices such as those that are horizontally spaced-apart so that the aircraft may be positioned therebetween do not have sufficient maneuverability so that the critical portions of the aircraft may be efficiently and quickly deiced. Additionally, it is not believed that the prior art devices provide a reliable and efficient means for extending the electrical wires, hydraulic fluid lines and deicing fluid lines from sources of electrical power, hydraulic power and deicing fluid to the deicing device and especially to the outer end of the telescoping boom assembly.

SUMMARY OF THE INVENTION

An apparatus is described for deicing an aircraft in one pass of the aircraft through the apparatus which includes a pair of spaced-apart deicing devices. Each of the deicing devices includes a vertically disposed support tower having its lower end rigidly fixed to a supporting surface. An upstanding boom pedestal is rotatably mounted, about a horizontal axis, on the upper end of the support tower and has an elongated, telescopic boom assembly pivotally mounted about a horizontal axis thereon for selective extension and retraction therefrom. The telescopic boom assembly includes an inner boom member, one or more intermediate boom members, and an outer boom mounted on the outermost intermediate boom member. An elongated support is pivotally connected at its inner end to the outer end of the outer boom member. An operator's cab is selectively movably mounted on the outer end of the elongated support. The elongated support includes an automatic leveling device so that the operator's cab is maintained in the proper attitude regardless of the angular position of the boom assembly. At least one deicing spray nozzle is mounted on the operator's cab for spraying deicing fluid onto the aircraft. The interior of the support tower is hollow to permit the extension of electrical lines, hydraulic fluid lines and deicing fluid lines upwardly through the tower to the boom assembly. The boom assembly also includes a supporting means thereon for supporting the electrical wires, hydraulic fluid lines, and deicing fluid lines thereon. The operator's cab is maneuvered into the proper position by rotation of the boom assembly, pivotal movement of the boom assembly, and extension and retraction of the boom assembly.

It is therefore a principal object of the invention to provide an improved apparatus for deicing aircraft.

Still another object of the invention is to provide an apparatus for deicing an aircraft in one pass of the aircraft through the apparatus which includes a pair of spaced-apart deicing devices.

Still another object of the invention is to provide an apparatus of the type described wherein each of the deicing devices include a telescoping boom assembly which is pivotally and rotatably mounted on the upper end of a support tower.

Still another object of the invention is to provide a deicing apparatus for aircraft including a telescopic boom assembly which has sufficient range and maneuverability to efficiently and quickly deice the aircraft.

Still another object of the invention is to provide an apparatus for deicing an aircraft including a telescoping boom assembly having an operator's cab mounted on the outer end of the boom assembly with the operator's cab having spray nozzles mounted thereon.

Still another object of the invention is to provide an apparatus for deicing an aircraft including a telescoping boom assembly having an operator's cab mounted on the outer end of the boom assembly to protect the operator from environmental conditions and airborne deicing fluids.

Still another object of the invention is to provide an operator's cab for a deicing apparatus wherein means is provided for maintaining the operator's cab in a proper attitude regardless of the angular position of the boom assembly.

Still another object of the invention is to provide an apparatus for deicing an aircraft including a telescoping boom assembly having means thereon for supporting electrical wires, hydraulic fluid lines, and deicer fluid lines.

These and other objects will be apparent to those skilled in the art.

DESCRIPTION OF THE PREFERRED EMBODIMENT

Figure 1:
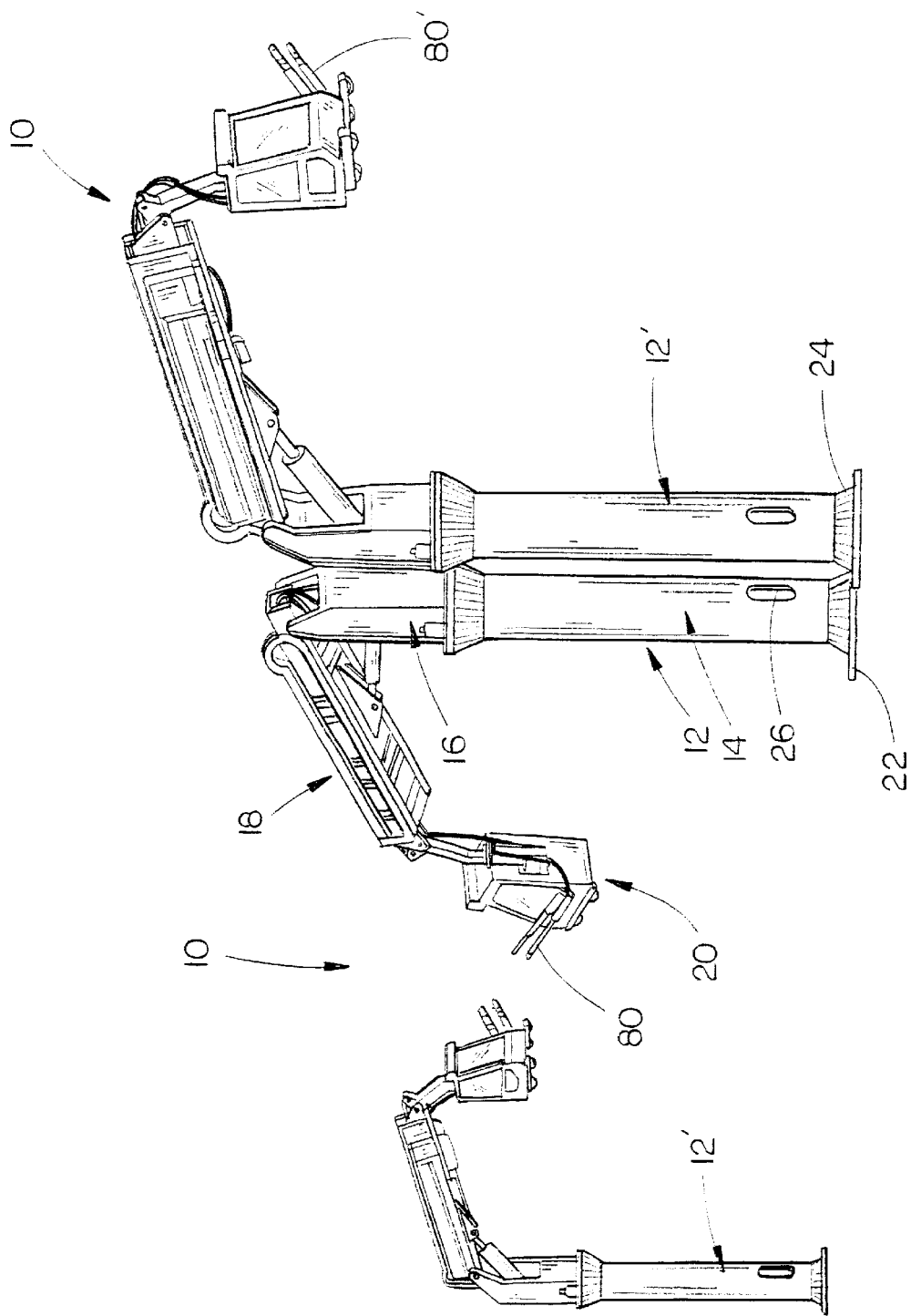
FIG. 1 is a perspective view illustrating the deicing apparatus of this invention.
Figure 2:
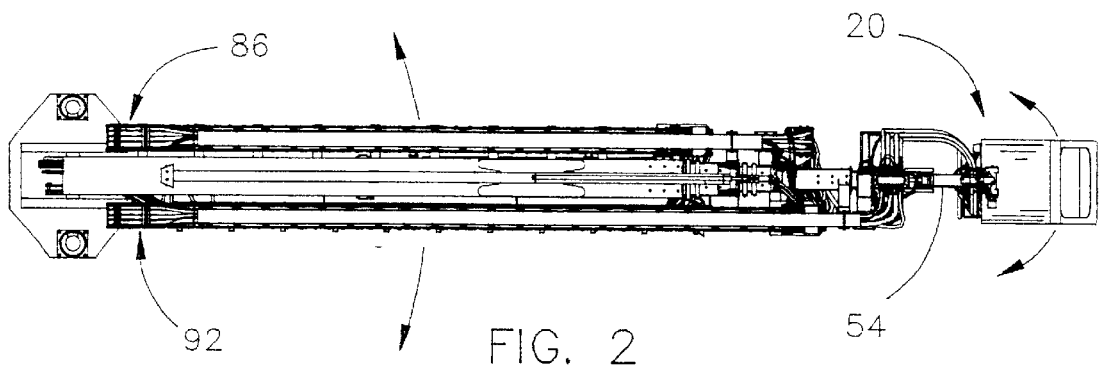
FIG. 2 is a top view of the deicing device with the boom assembly in its retracted position.

The apparatus for deicing an aircraft in one pass of the aircraft through the apparatus is generally referred to by the reference numeral 10. As seen in FIG. 1, the apparatus 10 includes a pair of deicing devices 12 and 12' which are sufficiently spaced-apart to enable an aircraft to pass therebetween. FIG. 1 also illustrates one-half of another apparatus 10 with it being understood that device 12' shown at the right-hand side of FIG. 1 would be used with another deicing device 12 spaced therefrom. Inasmuch as each of the deicing devices are identical, only deicing device 12 will be described in detail with identical structure on device 12' being indicated with "'".

Figure 6:
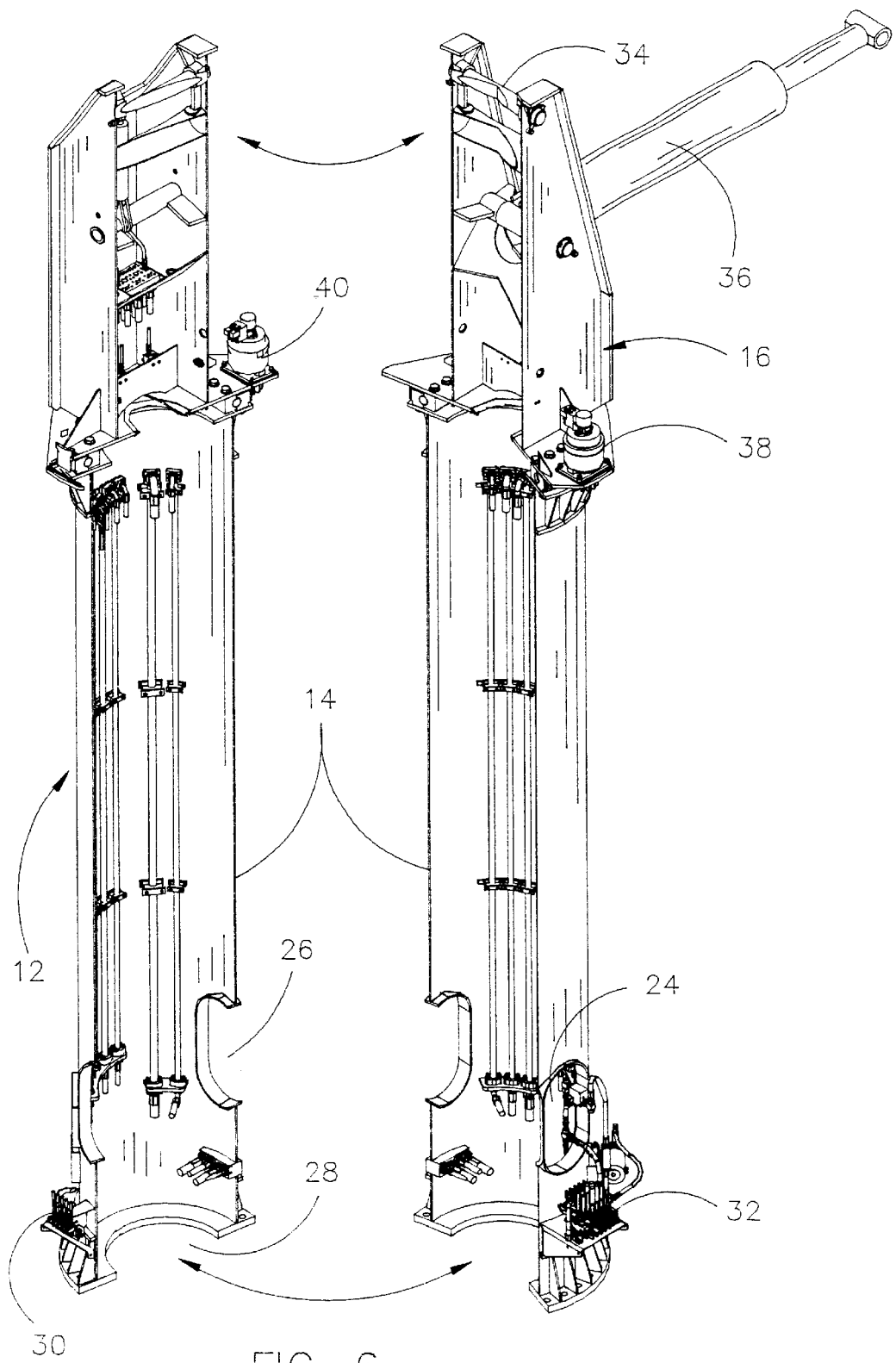
FIG. 6 is an exploded perspective view of the support tower and pedestal with the drawing illustrating the same split in two to more fully illustrate the invention.
Figure 7:
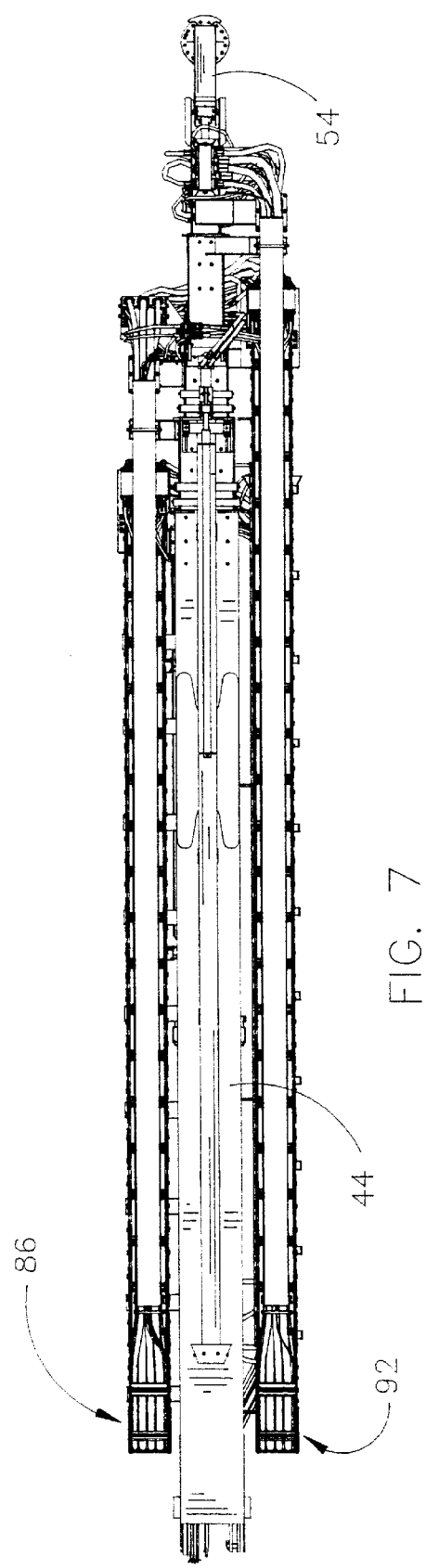
FIG. 7 is a top view of the boom assembly in its retracted position.
Figure 8:
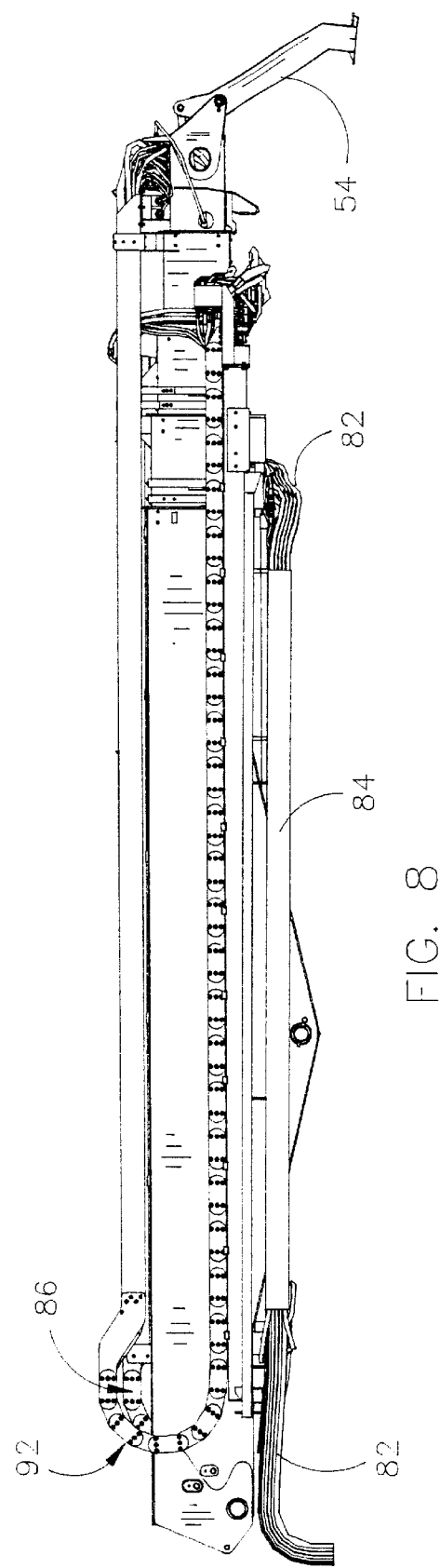
FIG. 8 is a side view of the boom assembly in its retracted position.
Figure 9:
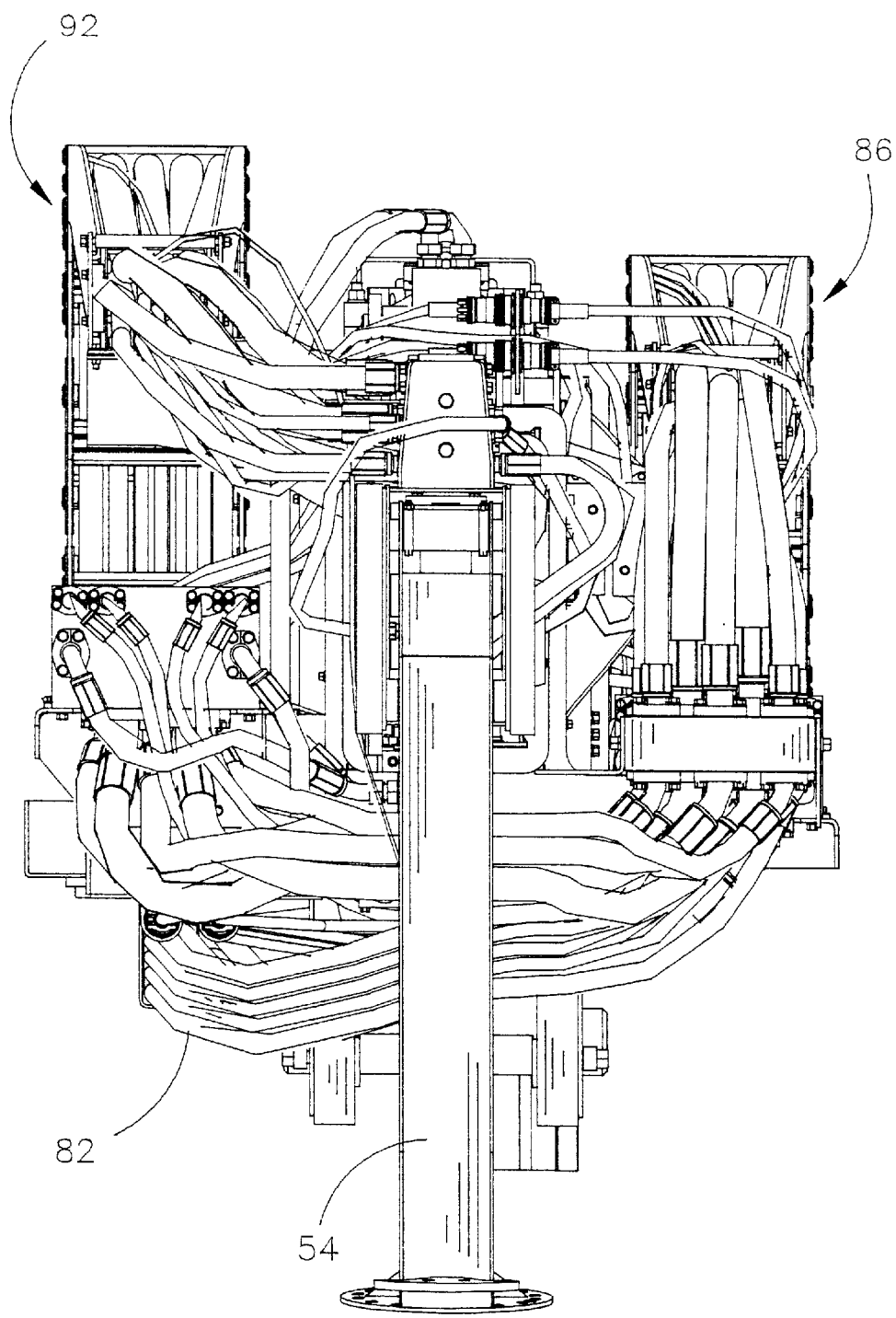
FIG. 9 is a rear view of the device illustrating the electrical wires, hydraulic fluid lines, and deicing fluid lines.
Figure 10:
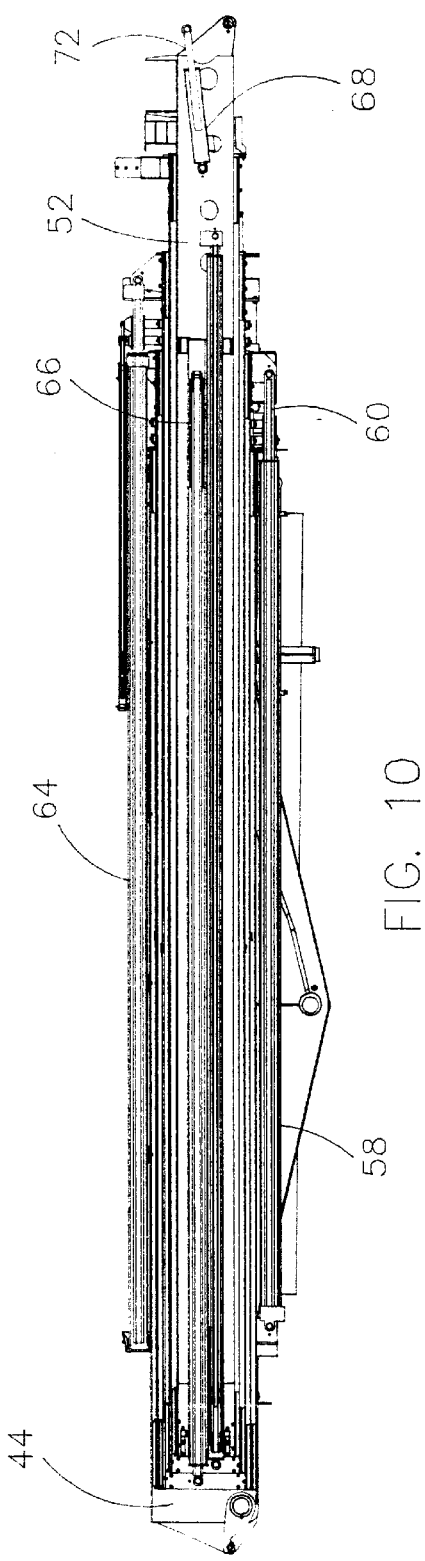
FIG. 10 is a side view of the boom assembly with portions thereof cut away to more fully illustrate the invention.
Figure 11:
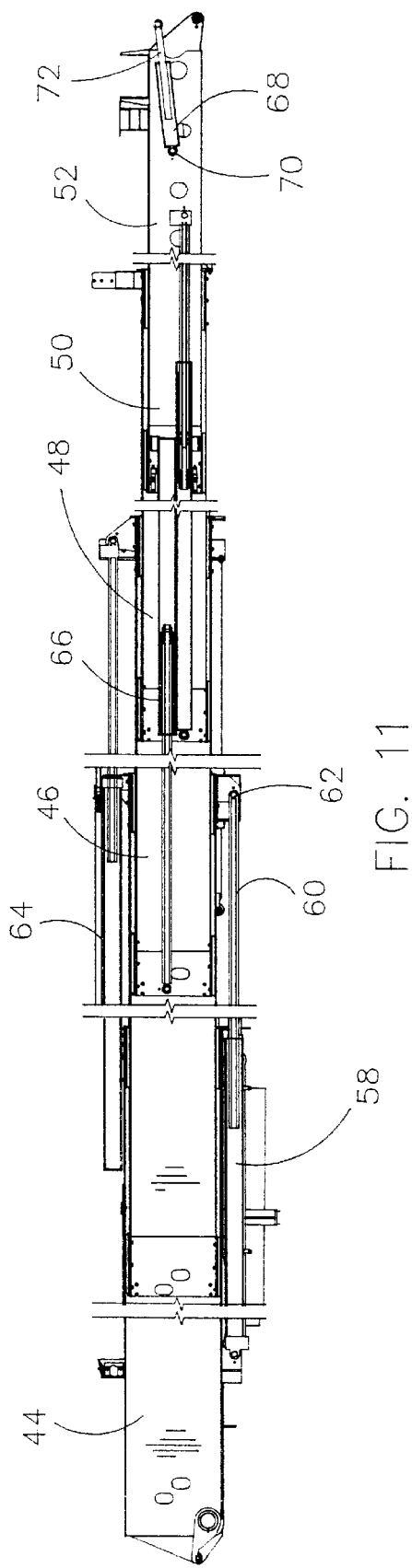
FIG. 11 is a side view of the boom assembly in an extended position.
Figure 12:
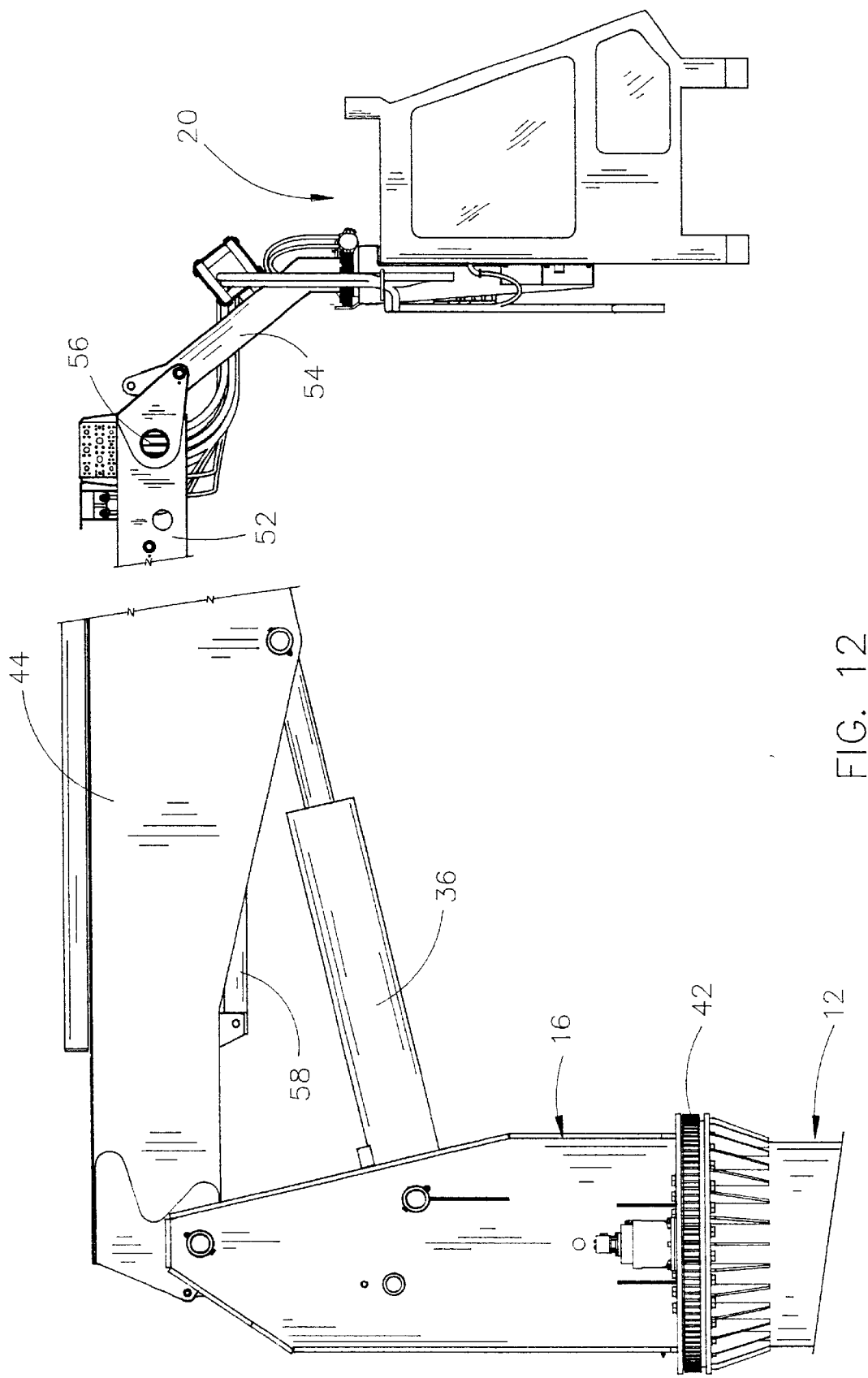
FIG. 12 is a fragmentary side view of the device.
Figures 13, 14:
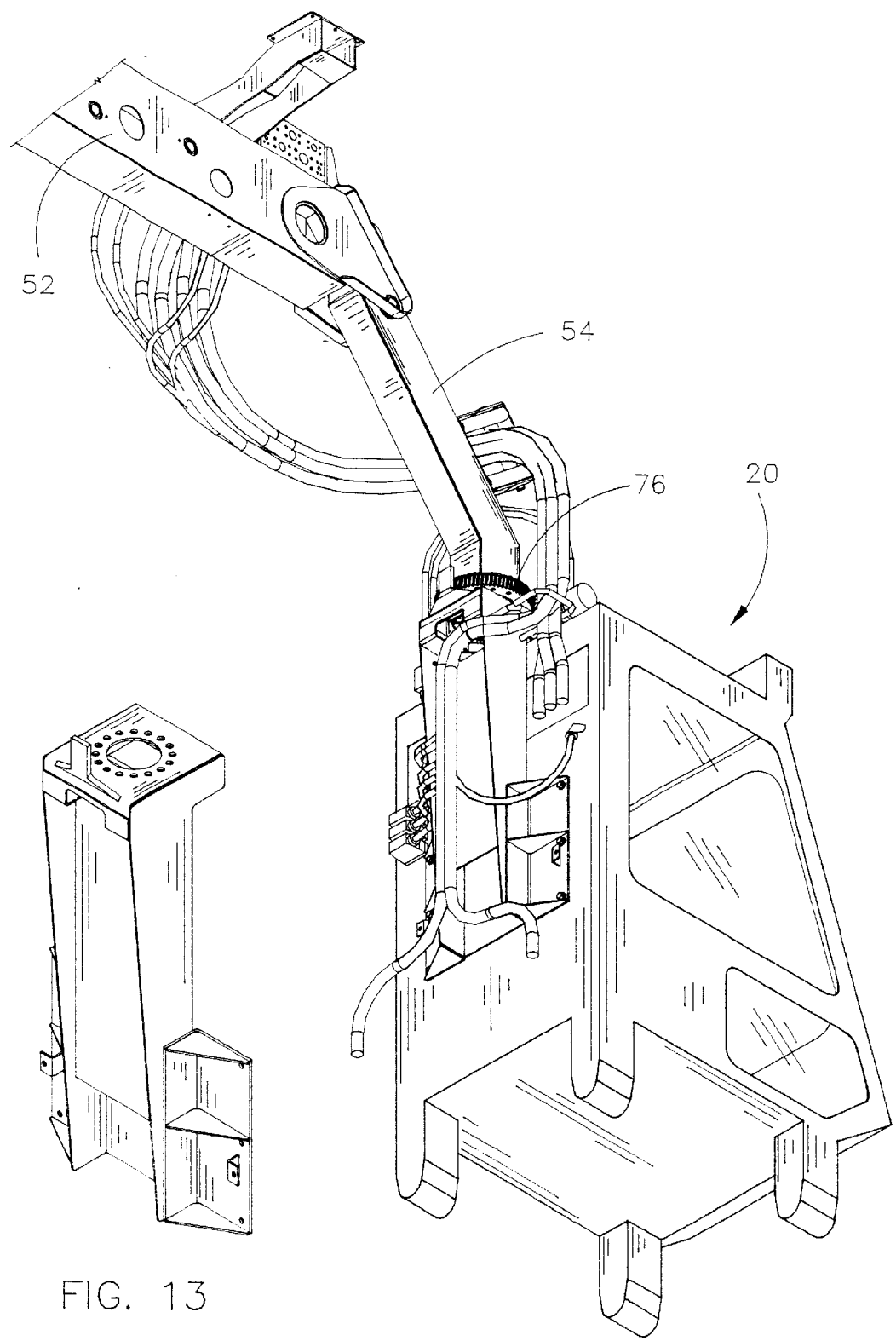
FIG. 13 is a partial perspective view of the support structure at the rear of the operator's cab.
FIG. 14 is a rear perspective view of the operator's cab with the structure of FIG. 13 removed therefrom.
Figures 15, 16:
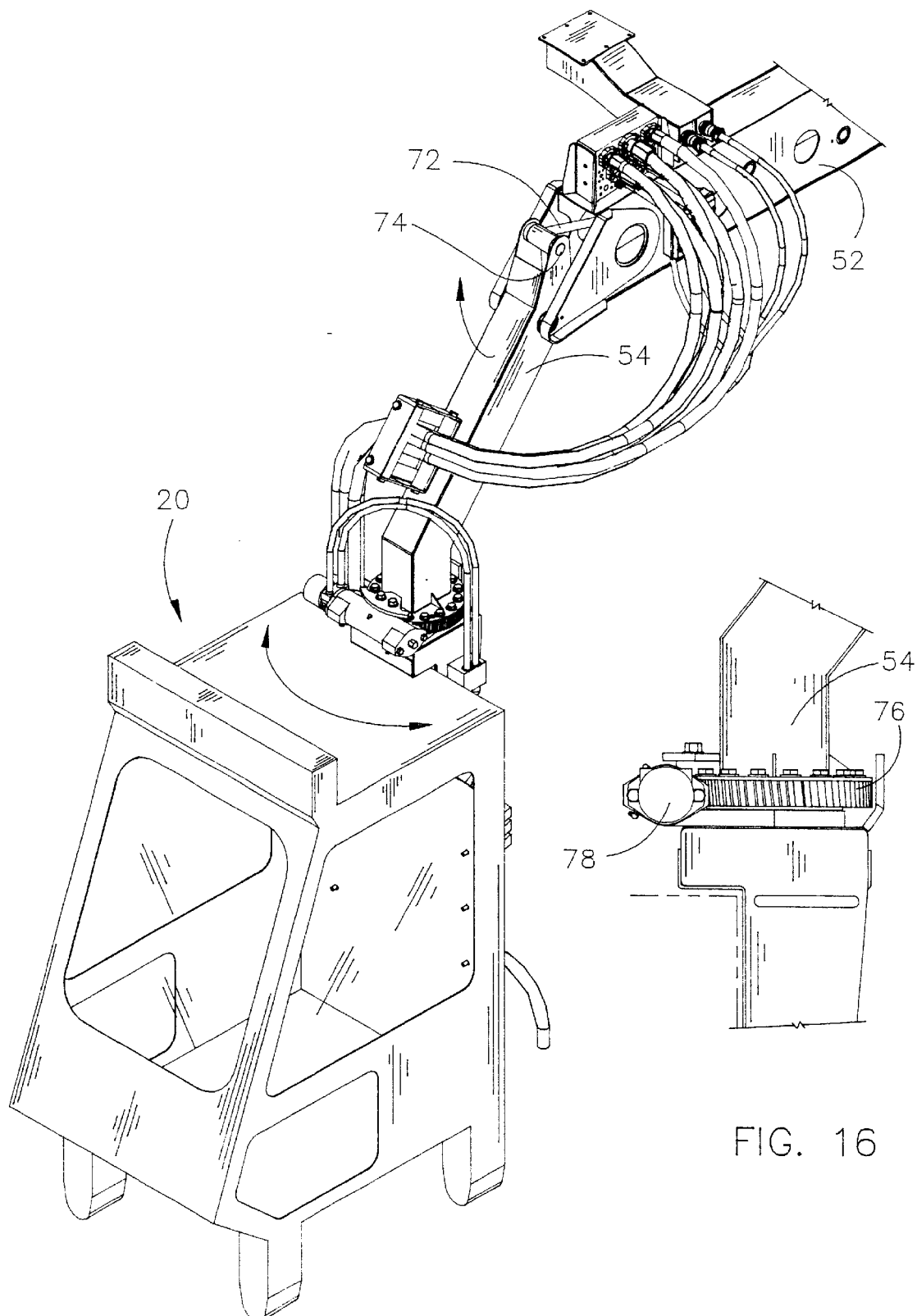
FIG. 15 is a front perspective view of the operator's cab illustrating its relationship to the boom assembly.
FIG. 16 is a side view of the mechanism for rotatably moving the operator's cab with respect to its supporting arm.
Figure 17:
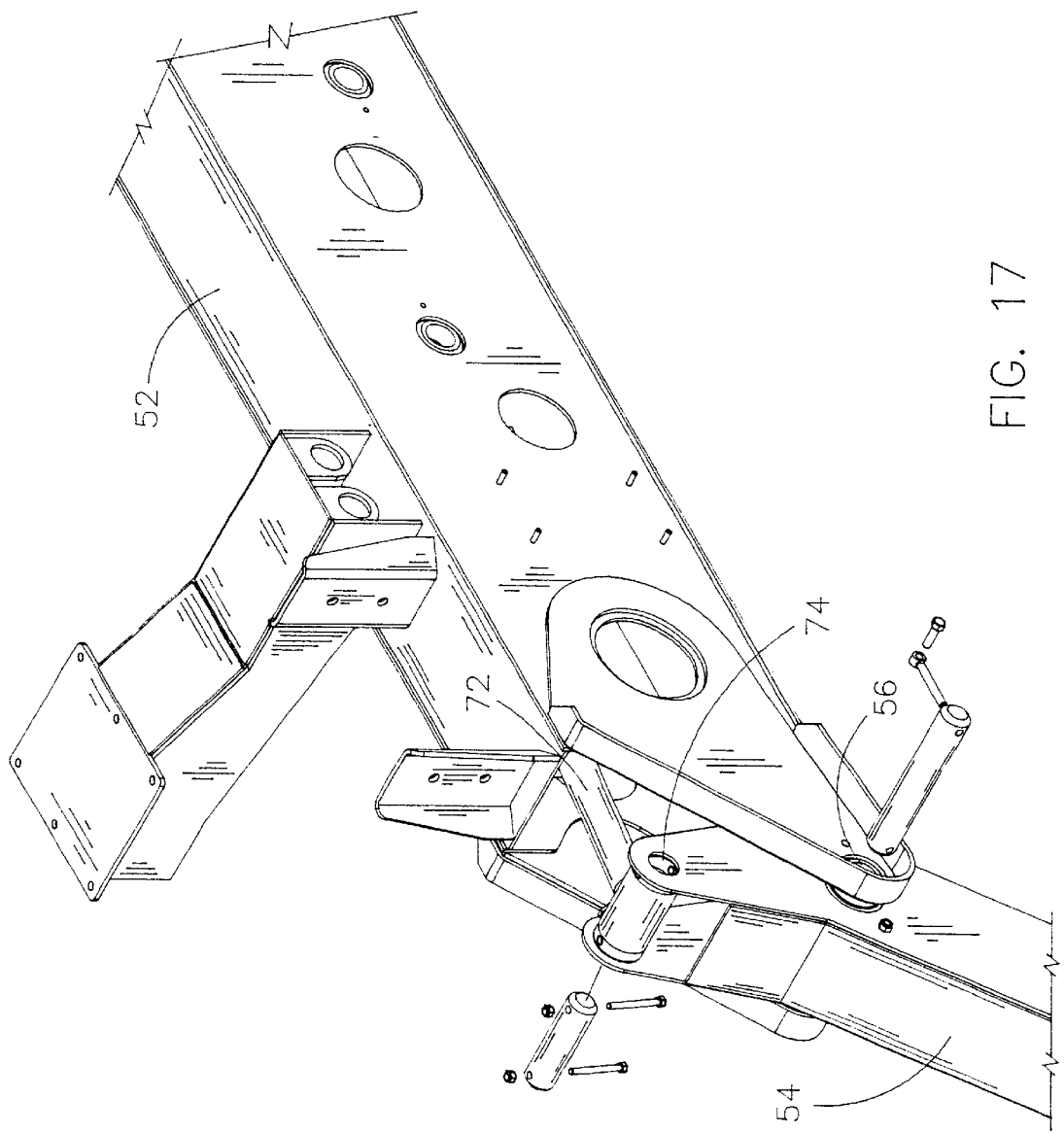
FIG. 17 is a partial exploded perspective view illustrating the manner in which the operator's cab supporting arm is pivotally secured to the outer end of the boom assembly.
Figure 18:
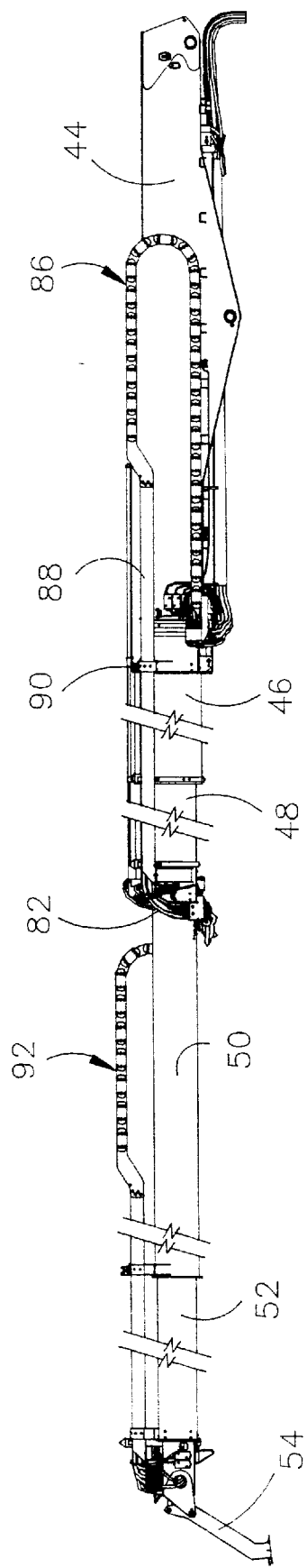
FIG. 18 is a partial side view of the boom assembly.

Generally speaking, deicing device 12 includes an upstanding support tower 14, a pedestal 16 which is rotatably mounted on the upper end of support tower 14, telescopic boom assembly 18 which is pivotally connected to the upper end of the pedestal 16, and an operator's cab 20 which is mounted at the outer end of the boom assembly 18. The lower end of tower 14 includes a base portion 22 which is secured to a suitable supporting surface such as a concrete footing or the like. As seen in the drawings, a plurality of reinforcing gussets 24 are secured to and extend between the tower 14 and the base plate 12 to add strength to the apparatus. Tower 14 is hollow and has an access opening 26 provided therein to permit maintenance personnel to gain access to the interior of the tower 14. As seen in FIG. 6, tower 14 is also provided with an access opening 28 through which extend electrical wires, hydraulic fluid conduits, and deicing fluid lines. Base plate 22 is also provided with a central opening 28 through which may be extended electrical wires, etc., if so desired. Controls 30 and 32 are provided at the lower end of the tower 14 for controlling the operation of the pedestal 16, boom assembly 18, etc.

The interior of pedestal 16 is also essentially hollow to permit the passage of wires, lines, etc., therethrough. The inner end of boom assembly 18 is pivotally connected to the upper end of the pedestal 16 at 34. The boom assembly 18 may be raised and lowered with respect to the pedestal 16 by means of the hydraulic cylinder 36 in conventional fashion. Boom assembly 18 generally includes an inner boom member 44, intermediate boom members 46, 48, 50 and outer boom member 52. Although three intermediate boom members are illustrated, the number thereof will be dependent upon the particular required design. As seen in the drawings, boom member 46 is telescopically received within boom member 44, boom member 48 is telescopically received in boom member 46, boom member 50 is telescopically received in boom member 48, and boom member 52 is telescopically received within boom member 50. The outer end of boom member 52 has an elongated support 54 pivotally connected thereto at 56. As will be described in more detail hereinafter, cab 20 is rotatably mounted to the outer end of the support 54.

One end of hydraulic cylinder 58 is connected to boom member 44 with its rod 60 being connected to the outer end of boom member 46 at 62 to cause longitudinal movement of boom member 46 with respect to boom member 44. Hydraulic cylinder 62 is provided for causing the extension and retraction of boom member 48 with respect to boom member 46. Hydraulic cylinder 66 is provided for causing the extension and retraction of boom member 50 with respect to boom member 48. Similarly, hydraulic cylinders are provided for causing the extension and retraction of boom members 50 and 52. The telescopic mounting of the boom members 46, 48, 50 and 52 and the hydraulic cylinders for the extension and retraction thereof is conventional in nature.

As stated, support 54 is pivotally connected to the outer end of boom member 52 at 56. One end of a hydraulic cylinder 68 is pivotally connected to the interior of boom member 52 at 70 with the rod 72 thereof being pivotally connected to the support 54 at 74. The hydraulic cylinder 68 is fluidly connected to the hydraulic circuitry of the invention, namely, the hydraulic cylinder 36, so that as the boom assembly 18 is pivotally moved upwardly with respect to pedestal 16 by the hydraulic cylinder 36, hydraulic cylinder 68 will be extended to cause the operator's cab 20 to be maintained in the proper attitude. Similarly, when the boom assembly 18 is pivotally moved downwardly by the hydraulic cylinder 36, hydraulic cylinder 68 is retracted to maintain operator's cab 20 in the proper attitude. The controls for the hydraulic cylinder 68 should also have a manual override so that the operator within the operator's cab 20 may also control the attitude of the operator's cab 20.

Operator's cab 20 is rotatably connected to the outer lower end of the support 54 by means of a ring gear 76 and gear motor 78. The rotation of the operator's cab 20 with respect to the support 54 may be controlled by the operator within the cab 20 or may be controlled by the controls 30 or 32 at the base of the tower 12. As seen in the drawings, cab 20 is enclosed so that the operator is not exposed to the elements or to spray drift. One or more spray nozzles 80 are mounted on the operator's cab 20 for spraying deicer fluid onto the aircraft.

Figure 3:
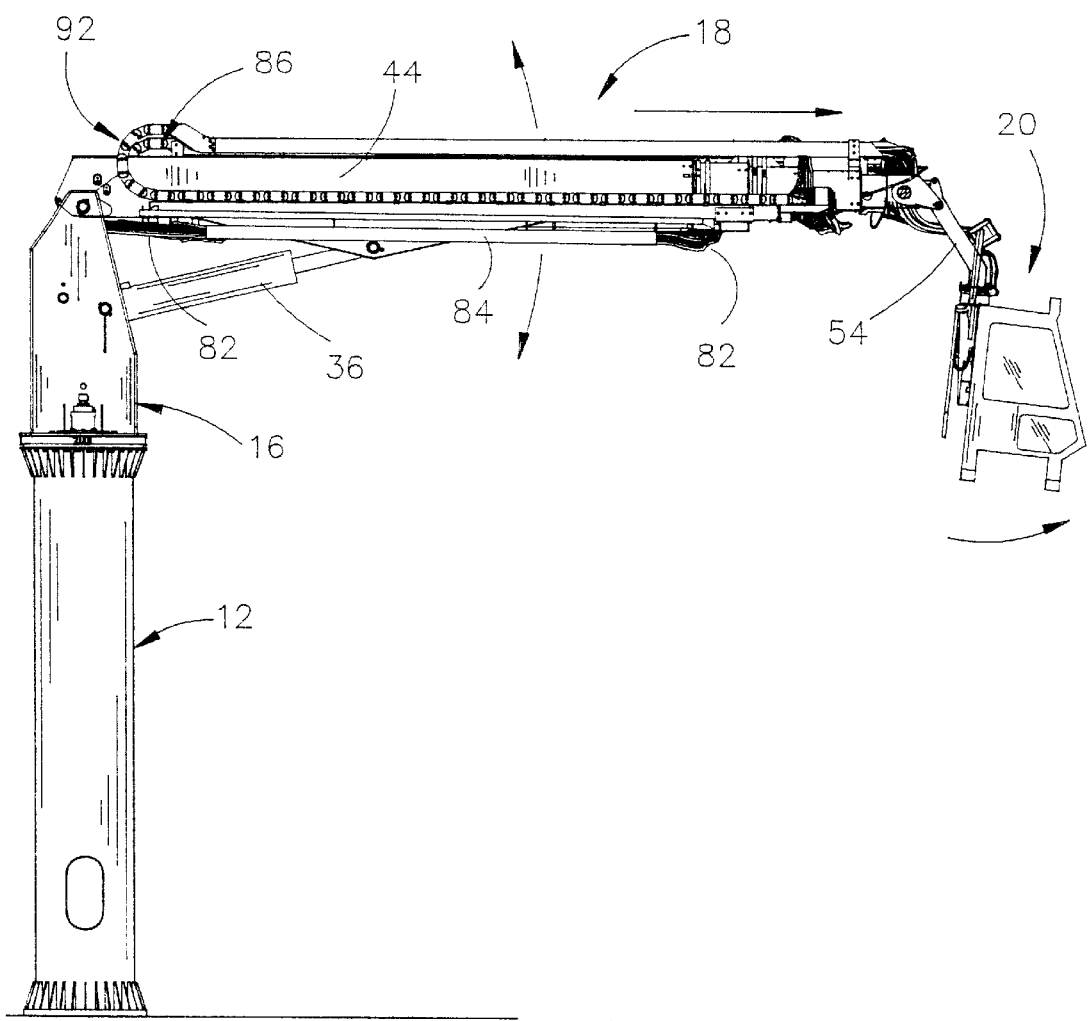
FIG. 3 is a side view of the device of FIG. 2.
Figure 4:
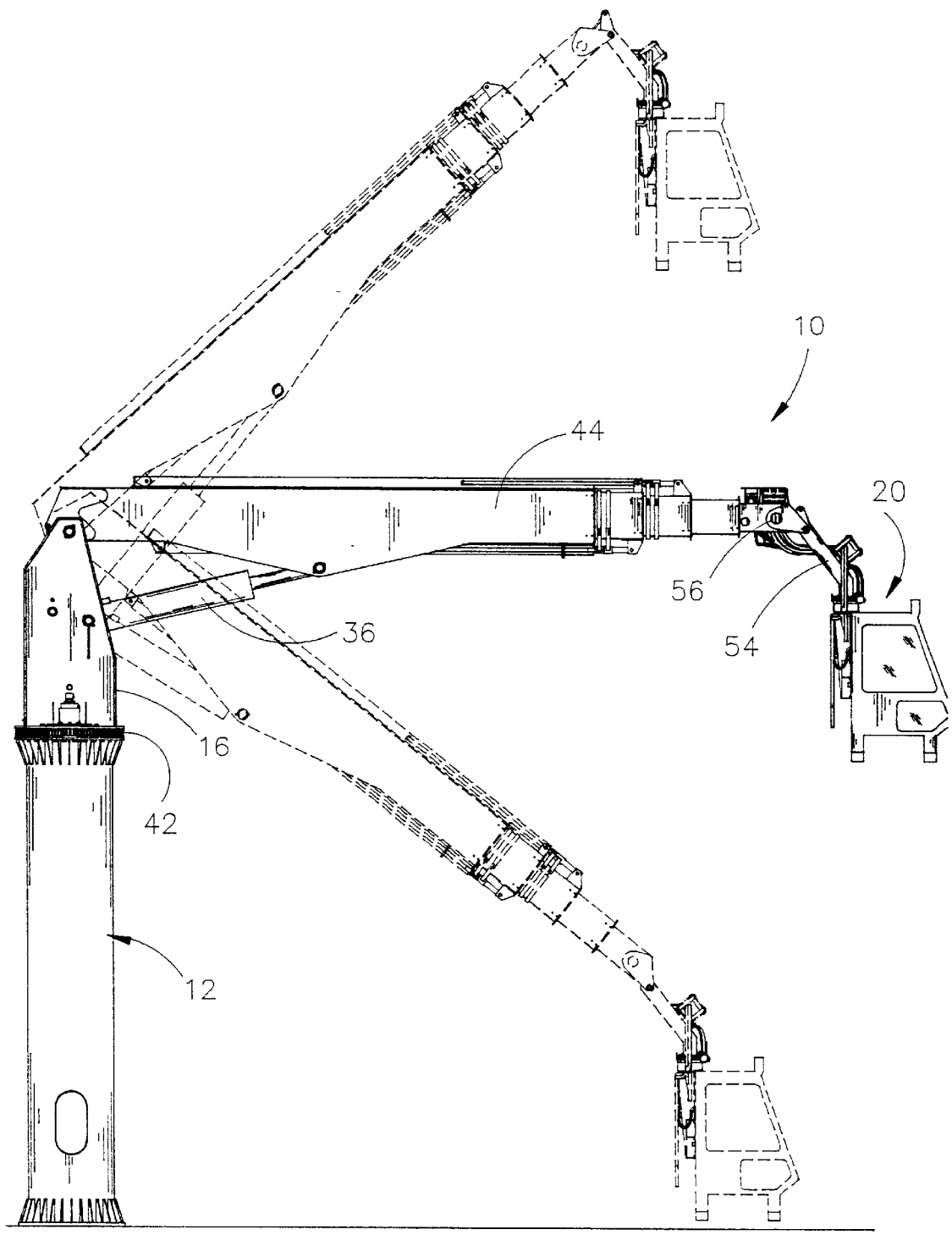
FIG. 4 is a side view of the device illustrating the manner in which the boom assembly may be raised and lowered, as shown in broken lines.
Figure 5:
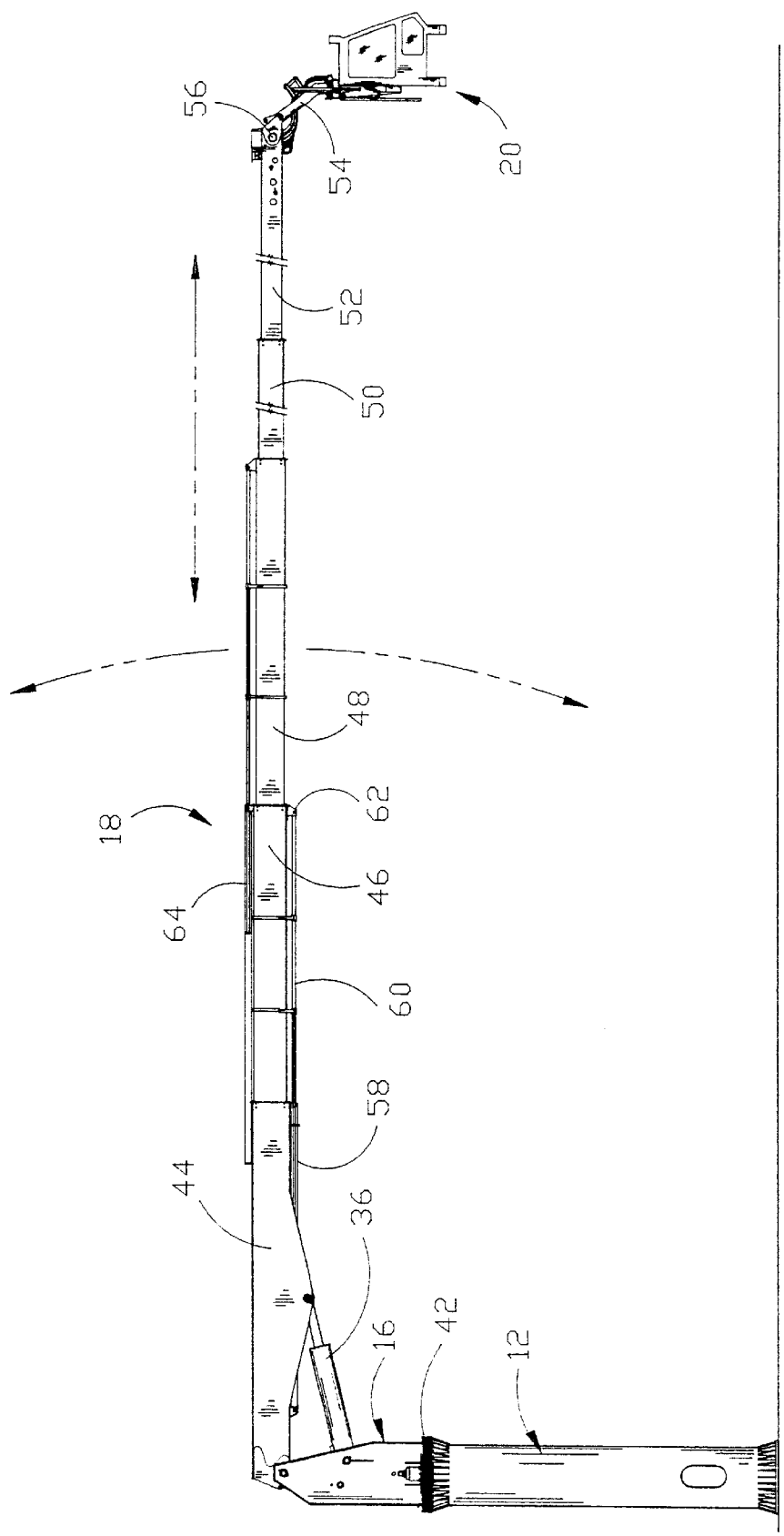
FIG. 5 is a side view illustrating the boom assembly in extended position.

The apparatus of this invention also includes what is believed to be a rather unique means for supporting the various electrical lines, hydraulic fluid lines, and deicer fluid lines on the boom assembly as will now be described. For purposes of description, the electrical wires, hydraulic fluid lines, and deicer fluid lines will be collectively described as comprising conduits 82. The conduits 82, as seen in FIG. 3, exit the upper end of the pedestal 16 and pass into an elongated tube 84 which is fixed to the boom member 44. The conduits 82 exit the tube 84 at the forward end thereof and pass beneath the boom assembly 18 to the other side of the boom assembly 18 at which point they pass into a linked carrier which is referred to generally by the reference numeral 86. One end of carrier 86 is fixed to the forward end of boom member 44 and extends inwardly therefrom, thence upwardly and thence outwardly. The linked carrier 86, when boom member 46 is retracted into boom member 44, rests on the laterally extending support rods 86. The linked carrier 86 is mounted as shown to permit movement of the conduits 82 as the boom assembly is retracted and extended. The conduits 82 exit the forward end of the carrier 86 and pass into the rearward end of a tube 88 which has its forward end secured to the forward end of boom member 48 so that tube 88 moves with boom member 48. The rearward end of tube 88 is movably received within a guide 90 which is secured to the outer of boom member 46. The conduits 82 exit the outer end of the tube 88 and extend downwardly along one side of boom member 48, thence beneath boom member 48 and then enter one end of a linked carrier 92 which is secured to boom member 50 for movement therewith. The outer end of linked carrier 92 is secured to bracket 94 which is secured to the outer end of boom member 50 for movement therewith. Bracket 94 also includes a guide 96 which slidably receives an elongated tube 98 which has its outer end fixed to boom member 52 for movement therewith. The conduits 82 exit the outer end of the linked carrier 92 and pass into the inner end of the tube 98. The conduits 82 exit the outer end of the tube 98 and pass downwardly therefrom to the hydraulic cylinder 70, gear motor 78, the controls within the operator's cab and the spray nozzles. Thus, the various linked carriers and elongated tubes provide a convenient means of supporting the conduits 82 on the boom assembly and which have the ability to compensate for the extension and retraction of the boom assembly.

In use, the deicing devices 12 and 12' are constructed so that they are sufficiently far apart to permit an aircraft to pass therebetween. When an aircraft is positioned therebetween, the boom assemblies 18 on the devices 12 and 12' may be extended or retracted, raised or lowered, and rotated either clockwise or counterclockwise with respect to the support towers so that the operators within the cabs may spray deicing fluid onto the critical surfaces of the aircraft requiring deicing. The rotational, pivotal and extension and retraction of the boom assemblies enable the operators to deice all of the critical surfaces on the aircraft in a single pass of the aircraft. The rotational capability of the operator's cab also enables the spray nozzles 80 to be directed onto the aircraft surfaces at the desired angles. The boom assemblies 18 may be either rotated on the towers 14 so as to be out of the way of the aircraft as the aircraft moves into and out of the deicing area or may be raised to permit the aircraft to pass therebeneath.

Thus it can be seen that the apparatus of this invention accomplishes at least all of its stated objectives.

I claim:

1. An apparatus for deicing an aircraft in one pass of the aircraft through the apparatus, comprising a pair of spaced-apart deicing devices, each of said deicing devices comprising:
    a vertically disposed support tower having upper and lower ends;
    said lower end of said support tower being rigidly fixed to a supporting surface;
    an upstanding boom pedestal rotatably mounted, about a vertical axis, on the upper end of said support tower;
    an elongated, telescopic boom assembly having inner and outer ends, pivotally mounted about a horizontal axis on said pedestal for selective extension and retraction with respect thereto;
    an elongated support, having inner and outer ends;
    said inner end of said elongated support being pivotally mounted, about a horizontal axis, to said outer end of said boom assembly;
    an operator's cab selectively movably mounted on said outer end of said elongated support;
    at least one deicing spray nozzle mounted on said operator's cab for spraying deicing fluid onto an aircraft;
    said deicing spray nozzle being in fluid communication with a source of pressurized deicing fluid.

2. The apparatus of claim 1 wherein said operator's cab is rotatably mounted, about a horizontal axis, to said outer end of said elongated support.

3. The apparatus of claim 1 wherein said elongated support includes an automatic cab leveling device for maintaining said operator's cab in a predetermined attitude regardless of the angular position of said boom assembly with respect to said pedestal.

4. The apparatus of claim 1 wherein said support tower is hollow to permit the passage of electrical wires, hydraulic lines, and deicing fluid lines therethrough.

5. The apparatus of claim 4 wherein said pedestal has an interior passageway formed therein to permit the passage of electrical wires, hydraulic lines, and deicing fluid lines therethrough.

6. The apparatus of claim 2 wherein a hydraulic motor is provided for rotating said operator's cab with respect to said elongated support.

7. The apparatus of claim 1 wherein said operator's cab is enclosed.

8. The apparatus of claim 1 wherein said boom assembly comprises an outer boom section having inner and outer ends, at least one intermediate boom section having inner and outer ends, and an inner boom section having inner and outer ends; said inner end of said outer boom section being pivotally secured to said pedestal; said inner end of said elongated support being pivotally secured to said outer end of said inner boom section.

9. The apparatus of claim 1 wherein said boom assembly includes a supporting means for supporting electrical wires, hydraulic fluid lines, and deicer fluid lines thereon.

10. The apparatus of claim 9 wherein supporting means includes at least one tube member longitudinally movably mounted on said boom assembly which has the electrical wires, hydraulic fluid lines, and the deicer fluid lines extending therethrough.

11. The apparatus of claim 9 wherein said supporting means includes at least one linked carrier having the electrical wires, hydraulic lines, and deicer fluid lines mounted thereon.

12. An aircraft deicing apparatus, comprising:
    a vertically disposed support tower having upper and lower ends;
    said lower end of said support tower being rigidly fixed to a supporting surface;
    an upstanding boom pedestal rotatably mounted, about a vertical axis, on the upper end of said support tower;
    an elongated, telescopic boom assembly having inner and outer ends, pivotally mounted about a horizontal axis on said pedestal for selective extension and retraction with respect thereto;
    an elongated support, having inner and outer ends;
    said inner end of said elongated support being pivotally mounted, about a horizontal axis, to said outer end of said boom assembly;
    an operator's cab selectively movably mounted on said outer end of said elongated support;
    at least one deicing spray nozzle mounted on said operator's cab for spraying deicing fluid onto an aircraft;
    said deicing spray nozzle being in fluid communication with a source of pressurized deicing fluid.

13. The apparatus of claim 12 wherein said operator's cab is rotatably mounted, about a horizontal axis, to said outer end of said elongated support.

14. The apparatus of claim 12 wherein said elongated support includes an automatic cab leveling device for maintaining said operator's cab in a predetermined attitude regardless of the angular position of said boom assembly with respect to said pedestal.

15. The apparatus of claim 12 wherein said support tower is hollow to permit the passage of electrical wires, hydraulic lines, and deicing fluid lines therethrough.

16. The apparatus of claim 15 wherein said pedestal has an interior passageway formed therein to permit the passage of electrical wires, hydraulic lines, and deicing fluid lines therethrough.

17. The apparatus of claim 13 wherein a hydraulic motor is provided for rotating said operator's cab with respect to said elongated support.

18. The apparatus of claim 12 wherein said operator's cab is enclosed.

19. The apparatus of claim 12 wherein said boom assembly comprises an outer boom section having inner and outer ends, at least one intermediate boom section having inner and outer ends, and an inner boom section having inner and outer ends; said inner end of said outer boom section being pivotally secured to said pedestal; said inner end of said elongated support being pivotally secured to said outer end of said inner boom section.

20. The apparatus of claim 12 wherein said boom assembly includes a supporting means for supporting electrical wires, hydraulic fluid lines, and deicer fluid lines thereon.

* * * * *